(12) United States Patent
Awada et al.

(10) Patent No.: US 11,770,751 B2
(45) Date of Patent: Sep. 26, 2023

(54) SIGNALING FOR TARGET-INITIATED CONDITIONAL HANDOVER MODIFICATION VIA CANCELLATION

(71) Applicant: Nokia Solutions and Networks Oy, Espoo (FI)

(72) Inventors: Ahmad Awada, Munich (DE); Krzysztof Kordybach, Pulawy (PL); Jedrzej Stanczak, Wroclaw (PL); Jean-Michel Pugeat, Paris (FR); Tero Henttonen, Espoo (FI); Ingo Viering, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/149,343

(22) Filed: Jan. 14, 2021

(65) Prior Publication Data
US 2021/0243667 A1    Aug. 5, 2021

Related U.S. Application Data

(60) Provisional application No. 62/968,587, filed on Jan. 31, 2020.

(51) Int. Cl.
*H04W 36/38* (2009.01)
*H04W 36/36* (2009.01)
(Continued)

(52) U.S. Cl.
CPC ........... *H04W 36/38* (2013.01); *H04L 25/028* (2013.01); *H04W 36/36* (2013.01); *H04W 74/004* (2013.01)

(58) Field of Classification Search
CPC ..... H04W 36/38; H04W 36/36; H04W 36/08; H04W 36/0005; H04W 36/0058;
(Continued)

(56) References Cited

U.S. PATENT DOCUMENTS

2020/0267604 A1\* 8/2020 Hwang ................. H04W 76/27
2020/0413312 A1\* 12/2020 Han .................. H04W 36/0033
(Continued)

FOREIGN PATENT DOCUMENTS

KR    1020180122963 A    11/2018
WO    2019/157938 A1    8/2019

OTHER PUBLICATIONS

"Baseline CR for introducing Rel-16 NR Mobility Enhancement", 3GPP TSG-RAN WG3 Meeting #106, R3-197814, Nokia, Nov. 18-22, 2019, 148 pages.
(Continued)

*Primary Examiner* — Margaret G Mastrodonato
(74) *Attorney, Agent, or Firm* — Nokia Solutions and Networks Oy (57) ABSTRACT

A method may include receiving a request for conditional handover from a source node. The method may also include sending a conditional handover request acknowledgment message in response to the request. The method may further include sending a conditional handover cancellation message to a source node. The conditional cancellation message may include a genuine cancellation or a modification-related cancellation. Further, the method may include receiving a response message from the source node in response to the conditional handover cancellation message. In addition, the method may include deciding to keep or release user equipment context based on the response message.

20 Claims, 8 Drawing Sheets

(51) Int. Cl.
*H04W 74/00* (2009.01)
*H04L 25/02* (2006.01)

(58) Field of Classification Search
CPC .......... H04W 36/0077; H04W 74/004; H04W 74/006; H04W 74/0833; H04L 25/028; H04L 41/0816
See application file for complete search history.

(56) References Cited

U.S. PATENT DOCUMENTS

| | | | |
|---|---|---|---|
| 2021/0051550 A1* | 2/2021 | Latheef | H04L 41/0816 |
| 2021/0058836 A1* | 2/2021 | Kimba Dit Adamou | H04W 36/0079 |
| 2021/0105690 A1* | 4/2021 | Wu | H04W 36/0058 |
| 2021/0227428 A1* | 7/2021 | Bae | H04W 36/0033 |
| 2022/0038975 A1* | 2/2022 | Da Silva | H04W 36/08 |
| 2022/0279391 A1* | 9/2022 | Bae | H04W 36/08 |

OTHER PUBLICATIONS

"Conditional Handover Cancel & Modification", 3GPP TSG-RAN WG3 #105, R3-194065, Agenda : 15.3.1, Samsung, Aug. 26-30, 2019, 2 pages.

"3rd Generation Partnership Project; Technical Specification Group Radio Access Network; Evolved Universal Terrestrial Radio Access Network (E-UTRAN); X2 application protocol (X2AP) (Release 15)", 3GPP TS 36.423, V15.7.0, Sep. 2019, pp. 1-422.

"3rd Generation Partnership Project; Technical Specification Group Radio Access Network; NG-RAN; Xn application protocol (XnAP) (Release 15)", 3GPP TS 38.423, V15.5.0, Sep. 2019, pp. 1-311.

"Further Discussion on Modification of Ongoing CHO", 3GPP TSG RAN WG3#105, R3-193451, Agenda : 15.3.1, ZTE, Aug. 26-30, 2019, pp. 1-7.

"CHO Cancellation—Summary of Offline Discussion", 3GPP TSG-RAN WG3 Meeting #105, R3-194642, Agenda : 15.3.1, Ericsson, Aug. 26-30, 2019, 2 pages.

"Avoiding Race Condition in case of RRC Reconfiguration during CHO", 3GPP TSG-RAN WG3 Meeting #106, R3-196594, Agenda : 15.3.1.3, Nokia, Nov. 18-22, 2019, 3 pages.

"TP for E-UTRA Mob BL CR for TS 36.423 Conditional Handover—HO cancel", 3GPP TSG-RAN WG3 Meeting #106, R3-197615, Agenda : 15 3.1.4, ZTE, Nov. 18-22, 2019, 4 pages.

"Support of CHO", 3GPP TSG-RAN3 Meeting #104, R3-192665, Huawei, May 13-17, 2019, 13 pages.

Extended European Search Report received for corresponding European Patent Application No. 21151517.6, dated Jun. 23, 2021, 11 pages.

"CHO configuration/ execution remaining aspects", 3GPP TSG-RAN WG2#108 meeting, R2-1915736, Agenda Item: 6.9.3.1, Samsung, Nov. 18- 22, 2019, 5 pages.

"(TP for NR_Mob_enh BL CR for TS 38.423): Handover modification for CHO", 3GPP TSG-RAN3 Meeting #106, R3-196900, Agenda item: 15.3.1, Huawei, Nov. 18-22, 2019, 14 pages.

Office action received for corresponding European Patent Application No. 21151517.6, dated Apr. 5, 2023, 7 pages.

* cited by examiner

FIG. 1

| IE/Group Name | Presence | Range | IE type and reference | Semantics description | Criticality | Assigned Criticality |
|---|---|---|---|---|---|---|
| Message Type | M | | 9.2.3.1 | | YES | ignore |
| Source NG-RAN node UE XnAP ID | M | | NG-RAN node UE XnAP ID 9.2.3.16 | Allocated at the source NG-RAN node. | YES | ignore |
| Target NG-RAN node UE XnAP ID | M | | NG-RAN node UE XnAP ID 9.2.3.16 | Allocated at the target NG-RAN node. | YES | reject |
| Cause | M | | 9.2.3.2 | | YES | ignore |
| Candidate Cells To Be Cancelled List | | 0..<maxnoofCellsinCHO> | | | YES | reject |
| >Target Cell ID | M | | NR CGI 9.2.2.7 | | - | - |

| Range bound | Explanation |
|---|---|
| maxnoofCellsinCHO | Maximum no. cells that can be prepared for a conditional handover. Value is FFS. |

SIGNALING FOR TARGET-INITIATED CONDITIONAL HANDOVER MODIFICATION VIA CANCELLATION

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for signaling for target-initiated conditional handover (CHO) modification via cancellation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Various aspects of examples of the invention are set out in the claims.

According to a first aspect of the present invention, a method comprising: receiving, by a source node, a conditional handover cancellation message from a target node, wherein the conditional handover cancellation message comprises an indication indicating modification-related cancellation for a user equipment, and wherein the indication comprises a cause value or an information element.

According to a second aspect of the present invention, an apparatus comprising: at least one processor; and at least one memory including computer program code, wherein the at least one memory and the computer program code are configured, with the at least one processor, to cause the apparatus to at least: receive a conditional handover cancellation message from a target node, wherein the conditional handover cancellation message comprises an indication indicating modification-related cancellation for a user equipment, and wherein the indication comprises a cause value or an information element.

According to a third aspect of the present invention, A non-transitory computer storage medium encoded with a computer program, the program comprising instructions that when executed by one or more computers cause the one or more computers to perform operations comprising: receiving, by a source node, a conditional handover cancellation message from a target node, wherein the conditional handover cancellation message comprises an indication indicating modification-related cancellation for a user equipment, and wherein the indication comprises a cause value or an information element.

According to a fourth aspect of the present invention, a method comprising: sending, from a target node to a source node, a conditional handover cancellation message, wherein the conditional handover cancellation message comprises an indication indicating modification-related cancellation, and wherein the indication comprises a cause value or an information element.

According to a fifth aspect of the present invention, an apparatus comprising: at least one processor; and at least one memory including computer program code, wherein the at least one memory and the computer program code are configured, with the at least one processor, to cause the apparatus to at least: send, to a source node, a conditional handover cancellation message, wherein the conditional handover cancellation message comprises an indication indicating modification-related cancellation, and wherein the indication comprises a cause value or an information element.

According to a sixth aspect of the present invention, A non-transitory computer storage medium encoded with a computer program, the program comprising instructions that when executed by one or more computers cause the one or more computers to perform operations comprising: sending, from a target node to a source node, a conditional handover cancellation message, wherein the conditional handover cancellation message comprises an indication indicating modification-related cancellation, and wherein the indication comprises a cause value or an information element.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for signaling for target-initiated conditional handover (CHO) modification via cancellation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Figure 1:
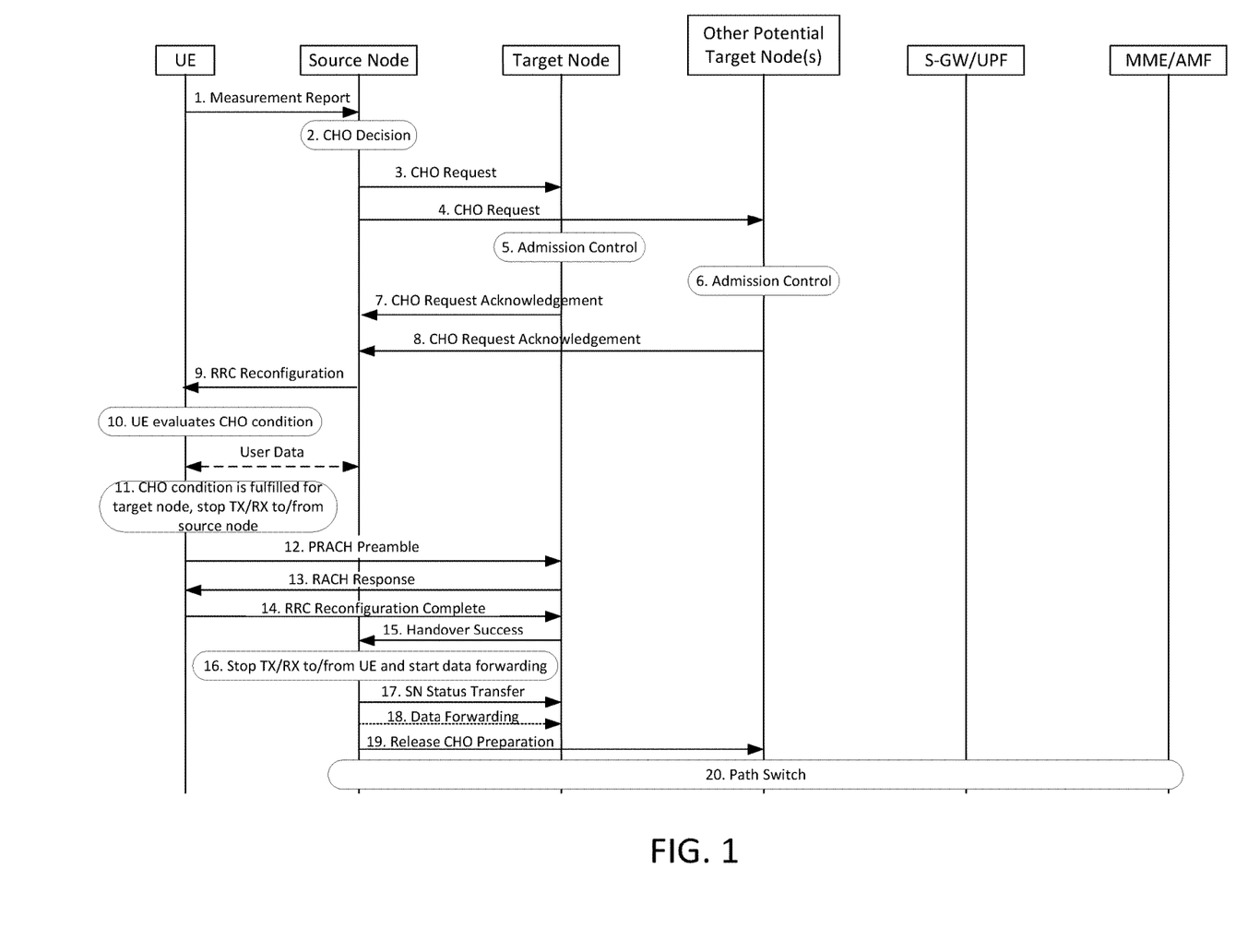
FIG. 1 illustrates an example signaling flow of a message sequence for conditional handover (CHO), according to an example embodiment.

Certain example embodiments may provide enhancements for conditional handover (CHO) specified for New Radio (NR) and Long Term Evolution (LTE). Certain aspects of CHO may be similar to the legacy handover. For instance, FIG. 1 illustrates an example signaling flow of a message sequence for CHO, according to an example embodiment. As illustrated in FIG. 1, steps 1-9 may be similar to the legacy handover. For instance, at step 1, a configured event may trigger the UE to send a measurement report to the source node. At step 2, based on the report, the source node may prepare one or more target cells in the same, or multiple target nodes for the (conditional) handover (CHO Request+CHO Request Acknowledge). At step 3, the source node may send a CHO request to the target node, and at step 4, the source node may also send a CHO request to other potential target nodes. Further, at steps 5 and 6, the target node and other potential target nodes may perform an admission control procedure for the handover. At steps 7 and 8, the target node and other potential target nodes may send a CHO request acknowledgment to the source node. After receiving the CHO request acknowledgment, the source node may at step 9, send a radio resource control (RRC) reconfiguration (CHO command) to the UE.

In classic handover, the UE may immediately access the target cell to complete the handover. However, in case of the CHO, the UE may access the target cell once an additional CHO execution condition expires (i.e., the handover preparation and execution phases are decoupled). Further, the condition may be configured by the source node. One advantage that CHO provides is that the CHO command may be sent very early for example, when the UE is served still safe in the source cell, without risking the access in the target cell and the stability of its radio link. This means that the conditional handover may provide mobility robustness.

As further illustrated in FIG. 1, at step 10, after receiving the RRC reconfiguration from the source node, the UE may evaluate the CHO condition set by the source node. During this evaluation, user data may be exchanged between the UE and the source node. At step 11, the UE may successfully fulfill the CHO condition for the target node, and stop transmission (TX) and/or reception (RX) to/from the source node. At step 12, the UE may send a physical random access channel (PRACH) preamble to the target node, and at step 13, the target node may send a random access channel (RACH) response to the PRACH preamble. After the UE completes RRC reconfiguration, at step 14, the UE may send an RRC reconfiguration complete message to the target node. Then, at step 15, the target node may notify the source node that handover was successful by sending a handover success message.

After the source node receives notification of a successful handover, at step 16, the source node may stop TX/RX to/from the UE, and start data forwarding to the target node. At step 17, sequence number (SN) status transfer may be initiated from the source node to the target node. In addition, at step 18, the source node may forward data to the target node, and at step 19, the source node may release CHO preparation. Further, at step 20, the CHO handover procedure may be completed with a path switch.

In case the source node has prepared more than one target cell for CHO, late data forwarding may apply as shown in step 18 of FIG. 1. Once the UE completes the handover execution to the target cell (e.g., UE has sent RRC Reconfiguration Complete), the target node may send to the source node the "Handover Success" indication. When receiving this indication from the target node, the source node may stop its TX/RX to/from the UE, and start data forwarding to the target node in step 18. In case only one potential target cell is prepared for CHO (to avoid unnecessary data forwarding to target cell that the UE may not access), early data forwarding (i.e., source node forwards data when sending RRC Reconfiguration in step 9) may be applied. Further, the source node may release the CHO preparations in other target nodes (which are no longer needed) when it receives an "HO success" indication from the successfully accessed target node. Other target cells in the same target node may be released automatically.

Support for a modification of a prepared CHO command from the target side has been considered. For instance, one is that both the source and the target may trigger the modification of CHO configuration. In addition, when the source configuration needs to be changed, it may be left up to the network to update the UE stored CHO configurations so that they remain valid. Furthermore, whenever source configuration needs to be changed, one proposal is that the source may send the updated configuration to the target if a new CHO configuration is needed.

Additionally, the handling of CHO configuration may be split into two steps. In a first step, the RRCReconfiguration/RRCConnectionReconfiguration may be decoded including source configuration, if present, and CHO execution conditions (both decode and configure upon reception of RRCReconfiguration/RRCConnectionReconfiguration). In a second step, the target cell configuration may be applied (i.e., a stored RRCReconfigurationRRCConnectionReconfiguration prepared for the selected target), and the UE may do this upon meeting the CHO execution condition for the cell. However, it has been decided not to enable a separate target-initiated modification procedure. Instead, the target-initiated CHO cancel shall be used, which may be followed by a new CHO preparation from the source side to enable the target node to provide an updated CHO command.

Figure 2:
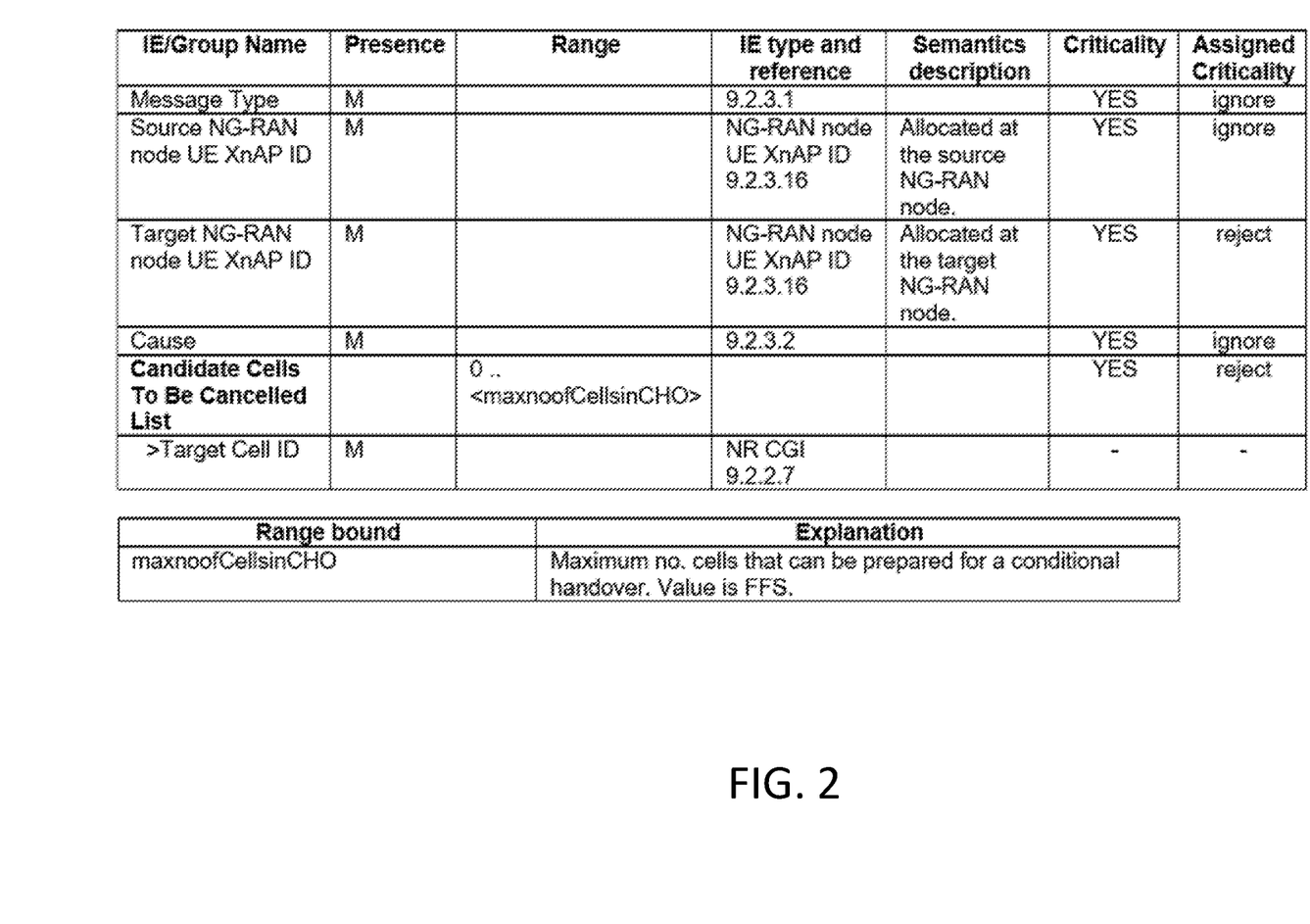
FIG. 2 illustrates information elements of CHO cancel message, according to an embodiment.

FIG. 2 illustrates information elements (IEs) of CHO cancel message, according to an embodiment. In particular, FIG. 2 illustrates a CHO cancel message. The cause IE may specify the reason for cancellation from the target node side, and may take value such as "no radio resources available in target cell," or "unknown PDU session ID," etc. However, in other examples, it may also take the value of "unspecified." The CHO cancel message may be sent by the target NG-RAN node to the source NG-RAN to cancel an already prepared CHO.

It has been acknowledged that there may be certain scenarios where the target may autonomously initiate modification of the issued CHO command Among those are admission related to modifications such as removal of previously admitted bearer, or modification in reserved contention-free random access resources (CFRA). Nonetheless, it may be desirable to consider enabling mechanisms that allow target-initiated modifications of the CHO command.

Certain problems exist with the current RAN3 solution based on the target-initiated CHO cancellation. For instance, the source node is not aware of the purpose of the CHO cancellation. This is because the same CHO cancel signaling is used for both a genuine cancellation and the modification-related cancellation. As a result, the source node does not know if it should send a new CHO request for the sake of enabling the target node to provide an updated CHO command or not.

Another problem is that the existing class-2 procedure used for target-initiated cancellation creates a race condition. Specifically, the target node does not know when the cancel information was delivered to the UE and whether the delivery was successful. As such, a situation may occur where the UE attempts to access the target cell after the target has already cancelled the CHO.

Previously, there have been proposals to enable a regular source or targeted-initiated modification procedure. However, no agreement was reached to avoid a situation where the target node maintains two UE contexts at the same time for the same target cell (i.e., the "old" UE context and the "new" one would exist in parallel when the modification procedure is being processed). The working assumption was that any modification of the CHO configuration should be based on the assumption that the old UE context is cancelled before the admission process for the new one is started. This is also reflected in the method for source-initiated CHO replacement solution, where a new CHO request implicitly cancels the prepared CHO at the target even before the admission procedure is started. Although this may be a simpler approach, it may not always be easily feasible or optimal.

To address the challenges exhibited in previously proposed solutions, certain example embodiments may include in the new CHO cancel message sent from the target node to the source node, an indication of the purpose of the cancel information. This may enable the source node to differentiate between a genuine (definitive) cancellation and a modification-driven cancellation. Based on this indication, the source node may decide on whether or not to send a new CHO request to the target node for providing an updated CHO command.

According to other example embodiments, it may be possible to avoid the race condition by having the target node retain the UE context (including CHO configuration) after sending the CHO cancel. According to one example embodiment, the target node may retain the UE context until it receives an explicit response from the source node. For instance, in one example embodiment, if the response of the source node indicates that the UE has been successfully reconfigured and has released CHO command, then the target node may release the UE context. In another example embodiment, if the response of the source node indicates that the reconfiguration of the UE has failed (e.g., UE has detached from the source cell and source cell did not receive an ACK from the UE), then the target node may retain the UE context for a period of time. In one example embodiment, the period of time may be up to implementation/operations, administration and maintenance (OAM). Once the UE completes CHO execution to the target cell or another prepared cell, the target node may remove the UE context following the procedure of FIG. 1 (e.g., step 19).

According to certain example embodiments, an indication/flag for target-initiated cancellation may be provided in the form of a cause value, or a separate IE in a CHO cancel message. However, the cause may be meant for statistical purposes and therefore the option of a separate IE may be preferable. In certain example embodiments, a new cause value (e.g., "CHO Modification-related Cancellation") may be added to indicate that the cancellation is modification-related and not a genuine/definitive cancellation. Alternatively, in another example embodiment, the indication/flag may be one value IE indicating that the CHO cancellation is a modification-related cancellation. According to a further example embodiment, the indication may have more values and may indicate the actual reason for the modification-related cancellation. For instance, one of the bearers/protocol data unit (PDU) sessions may not be supported/admitted any longer, a new bearers/PDU sessions that have been previously rejected may now be supported, or contention free RACH (CFRA) information changes.

In certain example embodiments, a CHO cancel response from the source to target node may be provided. such feedback from the source may be a response to the CHO cancel information from the target node. That is, the procedure which is currently assumed to be a class-2 procedure (CHO cancel procedure not requiring a response), should be converted to a class-1 procedure (CHO cancel procedure that requires a reponse). This may occur where the response is, for example, a "CHO Cancel Response". Furthermore, the response may convey the information if the CHO command/configuration was successfully removed from the UE. In certain example embodiments, the lack of the confirmation in "CHO Cancel Response" may mean that the source was unable to confirm the removal (i.e., the UE could have left the source cell). According to an example embodiment, this information may be indicated by including one value in the new proposed message "CHO Cancel Response".

According to certain example embodiments, instead of enabling the response to the CHO cancel procedure, the information about the status of the CHO in the UE (cancelled or not) may be part of a new "CHO Request" message from the source node in case the target indicates the CHO cancellation is modification-related. By combining the CHO cancel response with the new initiated CHO request from the source node, it may be possible to save one signaling.

Certain example embodiments may also provide another implementation-specific method that may avoid the race conditions at the expense of longer reservation of UE context resources. For instance, upon sending the CHO cancel message, the target node may start a timer with a specific duration X ms before releasing the UE context, i.e., the value of X is implementation specific which can be set by OAM. This enables effective postponement of the release of the UE context for a period of time in which the UE may attempt CHO execution to the target cell before receiving the RRC reconfiguration from the source cell to release the CHO command/configuration. However, this approach may exhibit certain drawbacks compared to assuming a response to the CHO cancel procedure.

For example, if the UE has released the CHO command/configuration within a time period that is much shorter than X, then the target node may have to keep the UE context (along with the reserved resources) for a longer time. Vice-versa, if the target node timer with duration X has expired, and the UE attempts execution of the CHO command/configuration to the related target cell, then the attempt may fail (HO failure). This would be counterproductive since the general concept of CHO is meant to minimize the risk of such a situation. This may occur, for instance, if the RRC Reconfiguration of the source node to release the CHO command/configuration was not received by the UE within the time duration less than X ms due to a delay or (re)-transmission errors over Xn and radio interface. Alternatively, the UE may have already detached from the source cell (CHO execution condition has expired), and the UE is performing contention-based random access (CBRA) to the target cell, which may not identify the UE before elapse of the time duration X ms (e.g., target node can identify the UE in case of CBRA when it receives Msg3 for contention resolution). Thus, in certain example embodiments, setting the time duration X ms may make the "CHO Cancel Response" solution more preferable and efficient.

Figure 3:
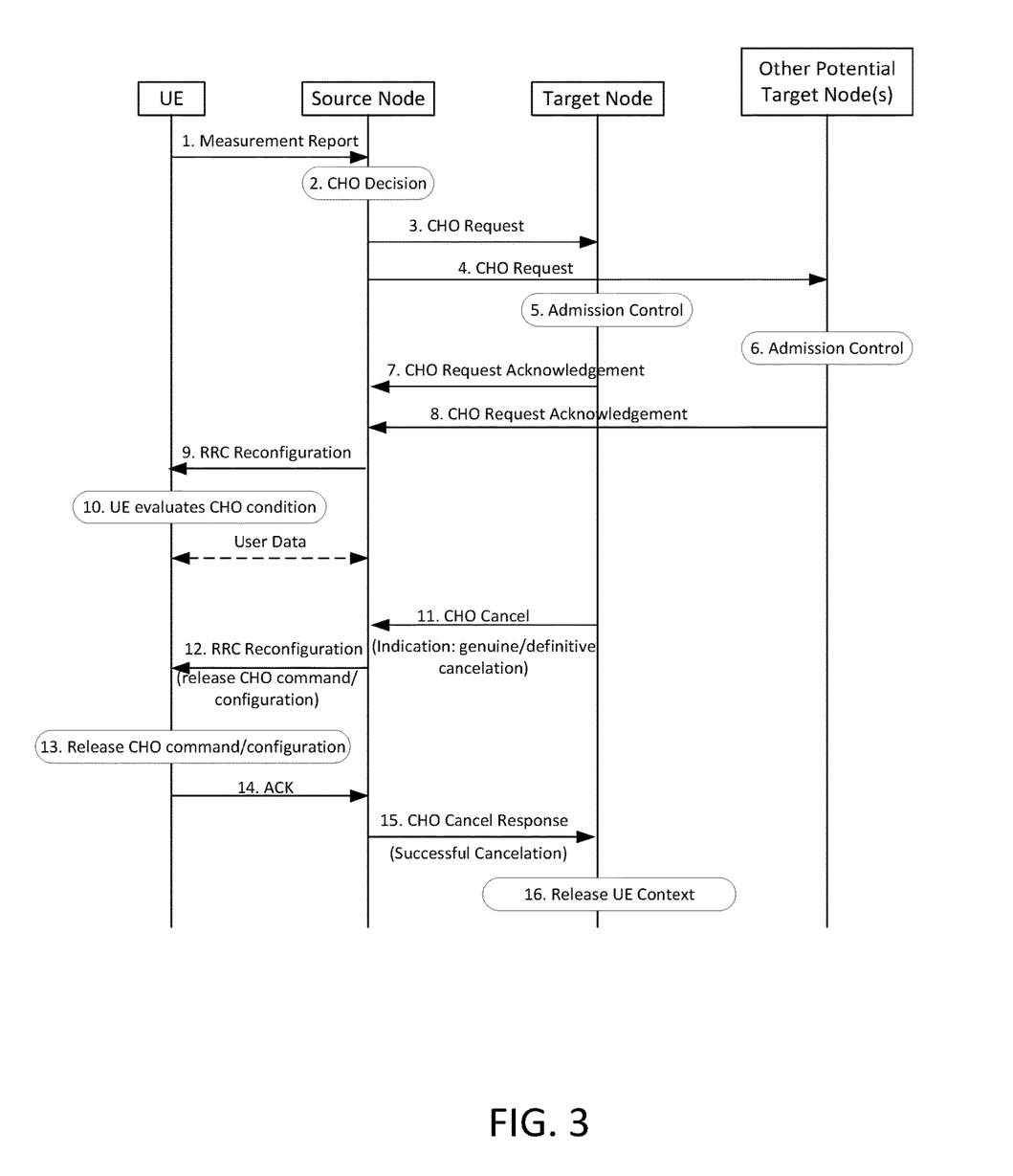
FIG. 3 illustrates a signaling flow of a method, according to an example embodiment.

FIG. 3 illustrates a signal flow of a method, according to an example embodiment. In particular, FIG. 3 illustrates a successful CHO cancellation for a genuine/definitive cancellation, according to an example embodiment. In other words, FIG. 3 illustrates an implementation for a case when the cancellation is genuine and the CHO command/configuration has been successfully removed from the UE. As illustrated in FIG. 3, steps 1-10 are similar to steps 1-10 in FIG. 1. However, at step 11, the target node may send a CHO cancel message to the source node. In one example embodiment, the CHO cancel message may include a genuine/definitive cancellation indication or flag. At step 12, the source node may send an RRC reconfiguration message to the UE. According to an example embodiment, the RRC reconfiguration message may include instructions for the UE to release the CHO command/configuration. After receiving the RRC reconfiguration message from the source node, the UE may, at step 13, release the CHO command/configuration, and at step 14, send an acknowledgement (ACK) message to the source node acknowledging that the CHO command/configuration has been released. At step 15, the source node may send a CHO Cancel Response message to the target node indicating that the cancellation was successful, and that the CHO command/configuration was successfully removed from the UE. After receiving the CHO cancel response message, the target node may, at step 16, release the UE context.

Figure 4:
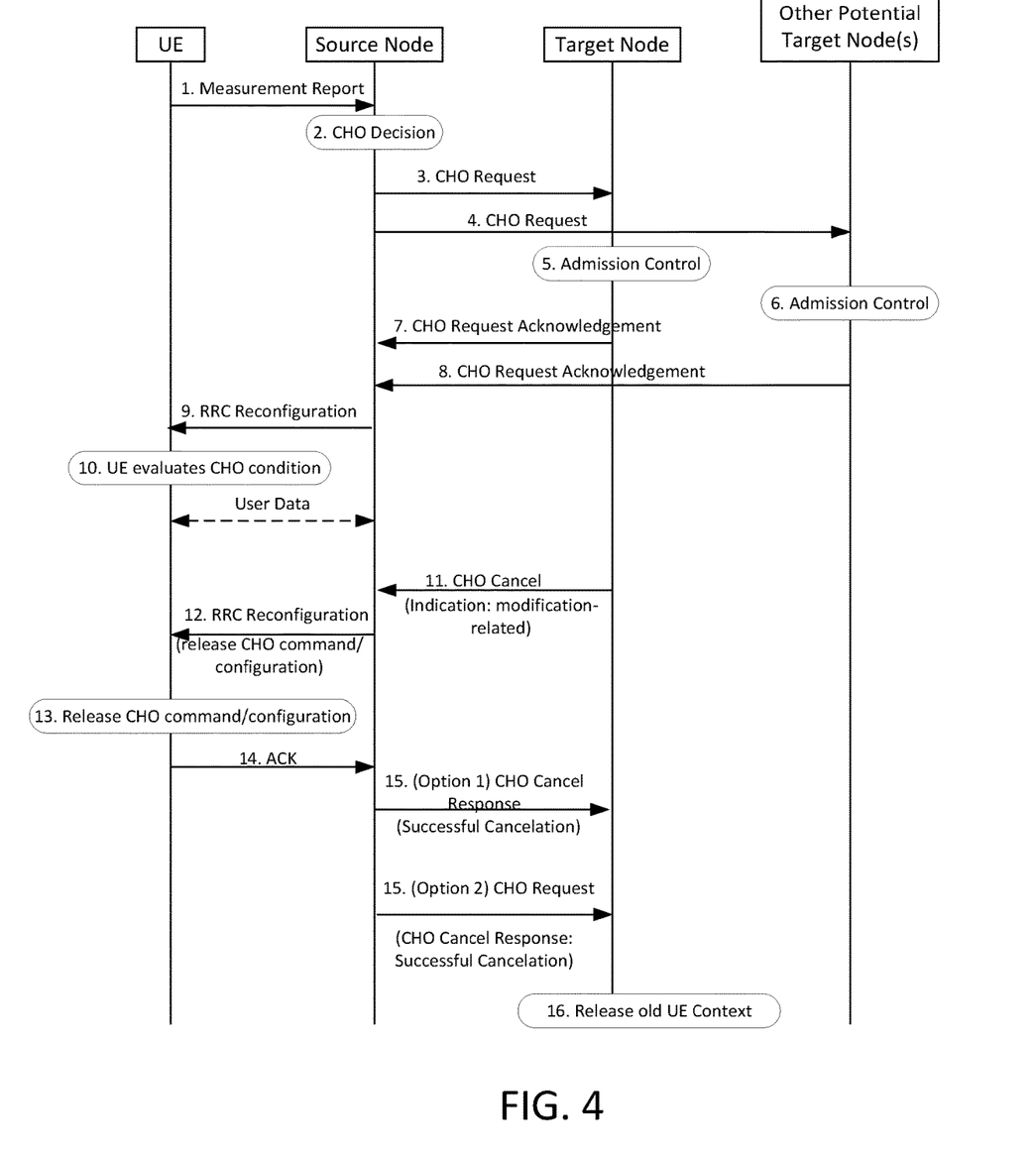
FIG. 4 illustrates a signaling flow of another method, according to an example embodiment.

FIG. 4 illustrates a signal flow of another method, according to an example embodiment. In particular, FIG. 4 illustrates a successful CHO cancellation for a modification-related cancellation. As illustrated in FIG. 4, there are two options for sending the CHO Cancel Response shown in step 15. The first one is a confirmation of the successfully pursued CHO cancellation and ACK received from the UE. The second one involves an embedded confirmation within a new CHO Request.

As with FIG. 3, steps 1-10 of FIG. 4 similar to steps 1-10 in FIG. 1. However, at step 11, the target node may send a CHO cancel message to the source node. In an example embodiment, the CHO cancel message may include a modification-related indication. At step 12, the source node may send an RRC reconfiguration message to the UE. According to an example embodiment, the RRC reconfiguration message may include instructions for the UE to release the CHO command/configuration. After receiving the RRC reconfiguration message from the source node, the UE may, at step 13, release the CHO command/configuration, and at step 14, send an acknowledgement (ACK) message to the source node acknowledging that the CHO command/configuration has been released. In the first option of step 15, the source node may send a CHO Cancel Response message to the target node. As noted above, in the first option, the CHO Cancel Response message may include an indication that the cancellation was successful, and confirming that the CHO command/configuration was successfully removed from the UE. In the second option of step 15, the source node may send another CHO Request message to the target node. Here, the CHO request message may include a CHO Cancel Response, indicating that the cancellation was successful, and providing an implicit confirmation of the successful cancellation. After receiving the CHO cancel response message or the CHO Request message, the target node may, at step 16, release the old UE context.

Figure 5:
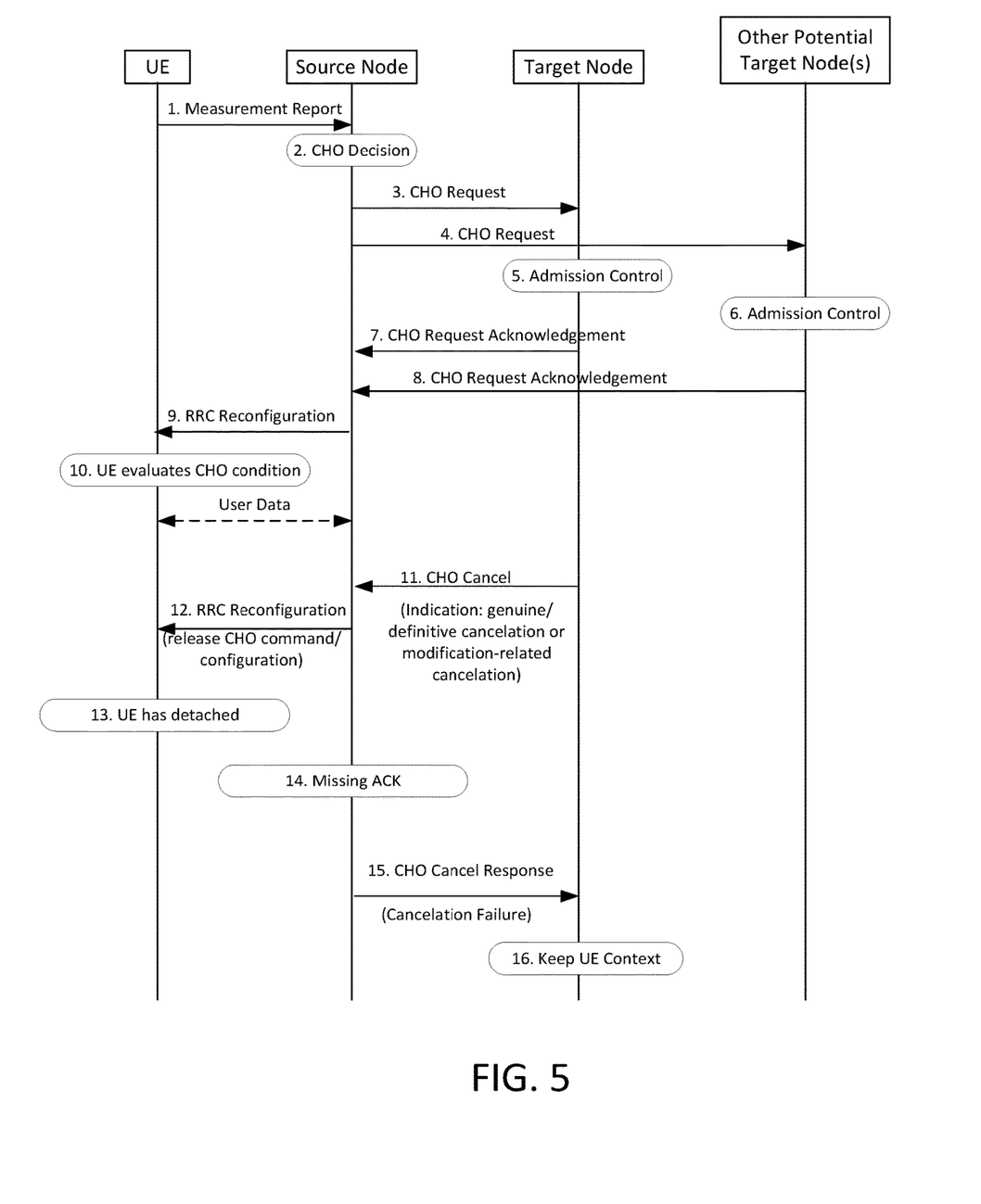
FIG. 5 illustrates a signaling flow of another method, according to an example embodiment.

FIG. 5 illustrates a signal flow of another method, according to an example embodiment. In particular, FIG. 5 illustrates the case when the CHO cancellation fails for genuine and modification-related cancellations. Here, the source node may try to reconfigure the UE after receiving the CHO Cancel message in step 11. When the source node realizes there is no ACK from the UE, confirming the release of CHO configuration, it may inform the candidate target node (via CHO Cancel Response), indicating the UE was not successfully de-configured. Thus, in an example embodiment, it may be beneficial to keep the UE context at this prepared CHO candidate target cell.

As with FIG. 3, steps 1-10 of FIG. 4 similar to steps 1-10 in FIG. 1. However, at step 11, the target node may send a CHO cancel message to the source node. In an example embodiment, the CHO cancel message may include an indication of a genuine/definitive cancellation or a modification-related cancellation. At step 12, the source node may send an RRC configuration message to the UE. According to an example embodiment, the RRC configuration message may include instructions for the UE to release the CHO command/configuration. At step 13, the UE may already be detached, and at step 14, the source node realizes that there is no ACK from the UE to confirm the release of the CHO command/configuration. As a result, at step 15, the source node may send a CHO Cancel Response message to the target node, indicating that the cancellation has failed. At step 16, after receiving the CHO Cancel Response, the target node may decide to keep the UE context.

Figure 6:
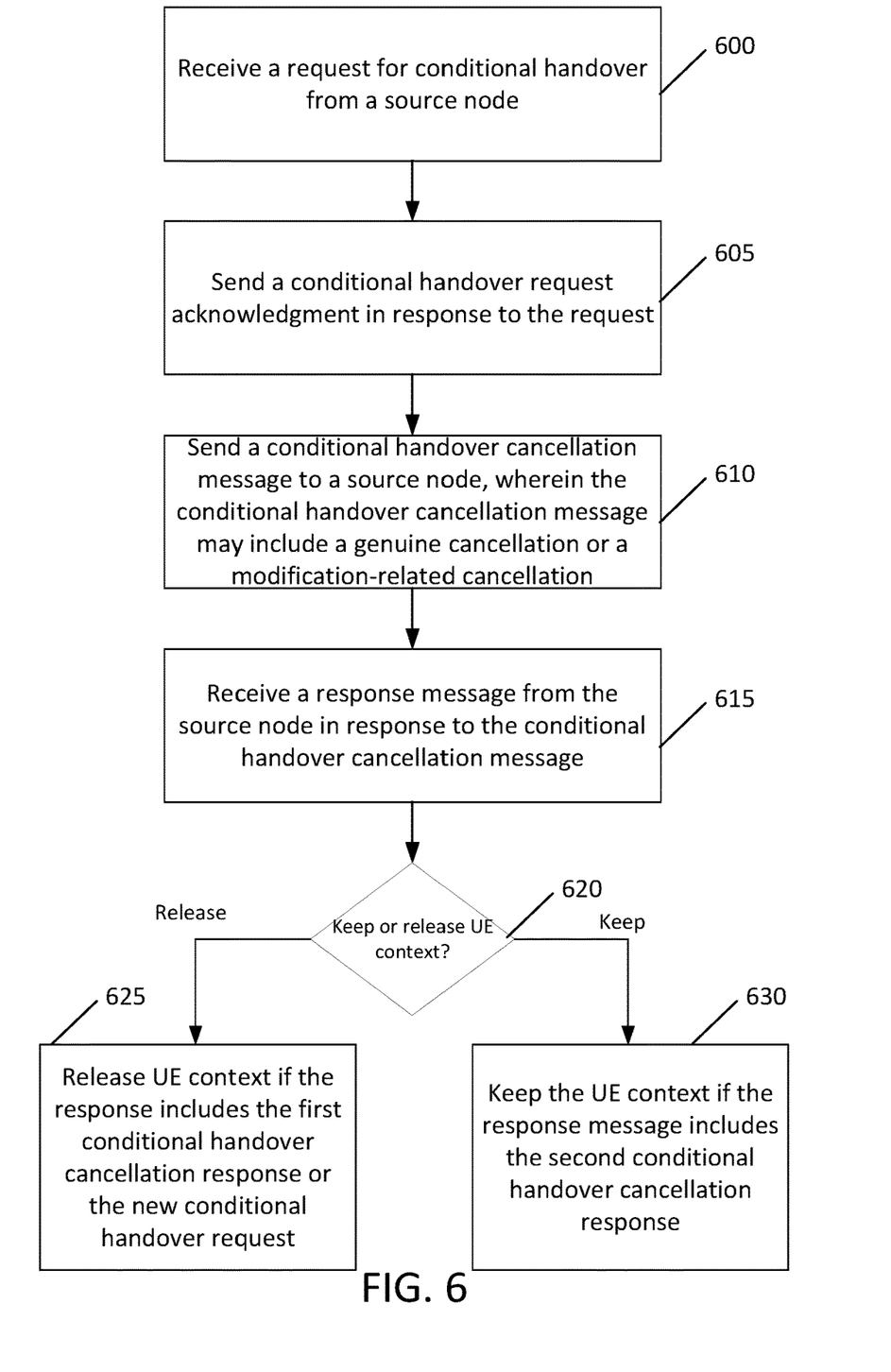
FIG. 6 illustrates a flow diagram of a method, according to an example embodiment.

FIG. 6 illustrates a flow diagram of a method, according to an example embodiment. In an example embodiment, the method of FIG. 6 may be performed by a telecommunications network, network entity or network node in a 3GPP system, such as LTE or 5G-NR. For instance, in an example embodiment, the method of FIG. 6 may be performed by a base station, eNB, or gNB for instance similar to apparatus 20 illustrated in FIG. 8(*b*).

According to an example embodiment, the method of FIG. 6 may include initially, at 600, receiving a request for conditional handover from a source node. The method may also include, at 605, sending a conditional handover request acknowledgment message in response to the request. The method may further include, at 610, sending a conditional handover cancellation message to a source node, wherein the conditional handover cancellation message may include a genuine cancellation or a modification-related cancellation. Further, at 615, the method may include receiving a response message from the source node in response to the conditional handover cancellation message. In addition, at 620, the method may include deciding to keep or release user equipment context based on the response message. At 625, the method may include releasing the UE context if the response message comprises the first conditional handover cancellation response or the new conditional handover request. Further, at 630, the method may include keeping the UE context if the response message comprises the second conditional handover cancellation response.

In an example embodiment, genuine cancellation or modification-related cancellation may be in the form of a cause value or a separate information element in the conditional handover cancellation message. In another example embodiment, the response message may include at least a first conditional handover cancellation response indicating that conditional handover command or configuration has been successfully removed from the UE, a new conditional handover request, or a second conditional handover cancellation response indicating that the UE was not successfully de-configured. According to an example embodiment, the new conditional handover request may include an implicit confirmation that conditional handover command or configuration has been successfully removed from the UE.

Figure 7:
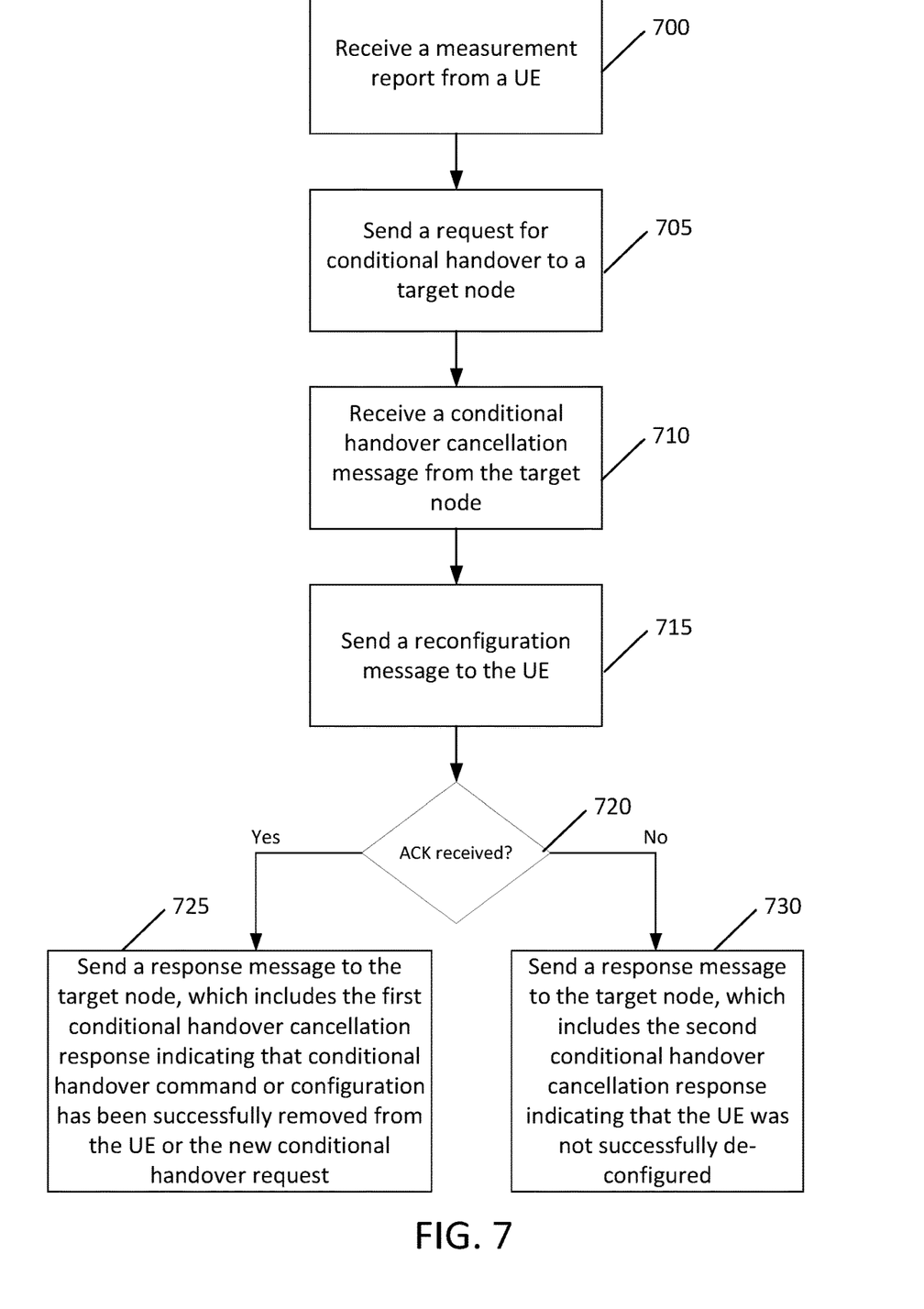
FIG. 7 illustrates a flow diagram of another method, according to an example embodiment.

FIG. 7 illustrates a flow diagram of another method, according to an example embodiment. As with FIG. 6, the method of FIG. 7 may be performed by a telecommunications network, network entity or network node in a 3GPP system, such as LTE or 5G-NR. For instance, in an example embodiment, the method of FIG. 7 may be performed by a base station, eNB, or gNB for instance similar to apparatus 20 illustrated in FIG. 8(*b*).

According to an example embodiment, the method of FIG. 6 may include initially, at 700, receiving a measurement report from a UE. The method may also include, at 705, sending a request for conditional handover to a target node in response to the measurement report. The method may further include, at 710, receiving a conditional handover cancellation message from the target node, wherein the conditional handover cancellation message may include a genuine cancellation or a modification-related cancellation. Further, at 715, the method may include sending a reconfiguration message to the UE in response to the conditional handover cancellation message. At 720, the method may include determining if an acknowledgment (ACK) message is received. If yes, at 725, the method may include sending a response message to the target node, which includes the first conditional handover cancellation response indicating that conditional handover command or configuration has been successfully removed from the UE or the new conditional handover request. If no, at 730, the method may include sending a response message to the target node, which includes the second conditional handover cancellation response indicating that the UE was not successfully de-configured.

In an example embodiment, genuine cancellation or modification-related cancellation may be in the form of a cause value or a separate information element in the conditional handover cancellation message. In another example embodiment, the response message may include at least a first conditional handover cancellation response indicating that conditional handover command or configuration has been successfully removed from the UE, a new conditional handover request, or a second conditional handover cancellation response indicating that the UE was not successfully de-configured. According to an example embodiment, the new conditional handover request may include an implicit confirmation that conditional handover command or configuration has been successfully removed from the user equipment.

Figure 8A:
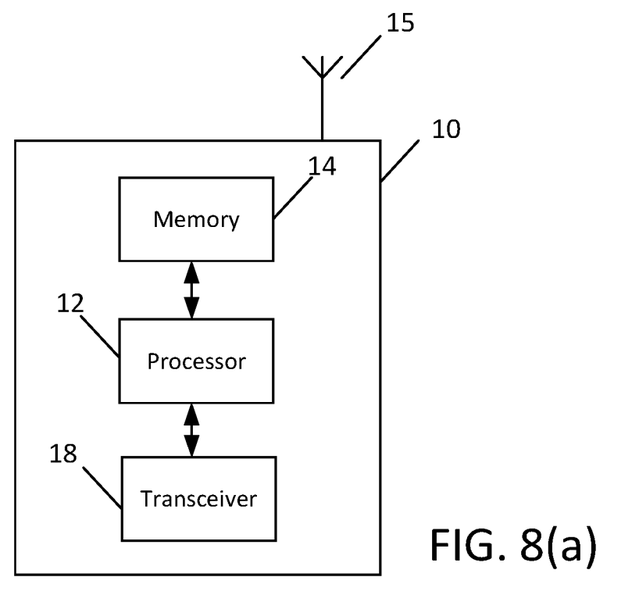
FIG. 8(a) illustrates an apparatus, according to an example embodiment.
Figure 8B:
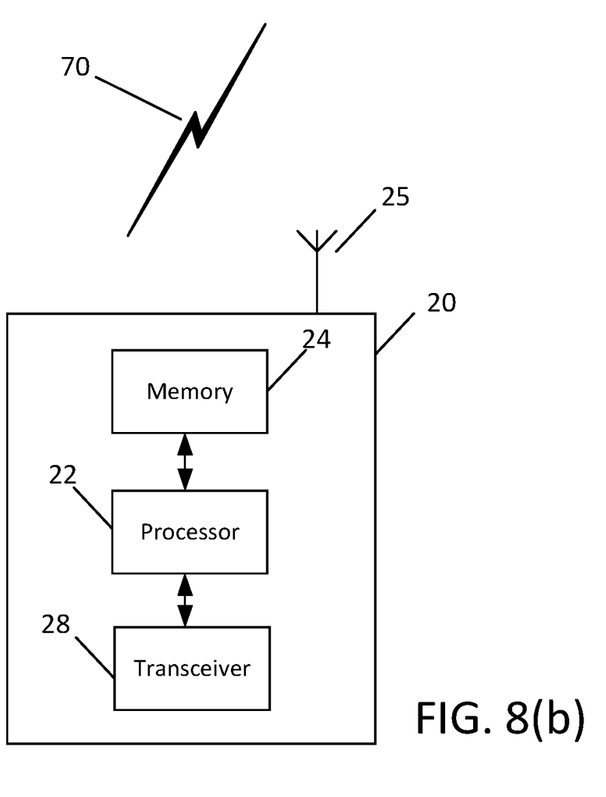
FIG. 8(b) illustrates another apparatus, according to an example embodiment.

FIG. 8(*a*) illustrates an apparatus 10 according to an example embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 8(*a*).

As illustrated in the example of FIG. 8(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8(*a*), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-5.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-5.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

FIG. 8(b) illustrates an apparatus 20 according to an example embodiment. In an example embodiment, the apparatus 20 may be a network element, node, host, or server in a communication network or serving such a network. For example, apparatus 20 may be a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 8(b).

As illustrated in the example of FIG. 8(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8(b), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-7.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-7.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in one example embodiment, apparatus 20 may be controlled by memory 24 and processor 22 to receive a request for conditional handover from a source node. Apparatus 20 may also be controlled by memory 24 and processor 22 to send a conditional handover request acknowledgment message in response to the request. Apparatus 20 may further be controlled by memory 24 and processor 22 to send a conditional handover cancellation message to a source node, wherein the conditional handover cancellation message may include a genuine cancellation or a modification-related cancellation. Apparatus 20 may also be controlled by memory 24 and processor 22 to receive a response message from the source node in response to the conditional handover cancellation message. In addition, apparatus 20 may be controlled by memory 24 and processor 22 to decide to keep or release user equipment context based on the response message.

In another example embodiment, apparatus 20 may be controlled by memory 24 and processor 22 to receive a measurement report from a UE. Apparatus 20 may also be controlled by memory 24 and processor 22 to send a request for conditional handover to a target node in response to the measurement report. Apparatus 20 may further be controlled by memory 24 and processor 22 to receive a conditional handover cancellation message from the target node, wherein the conditional handover cancellation message may include a genuine cancellation or a modification-related cancellation. Further, apparatus 20 may be controlled by memory 24 and processor 22 to send a reconfiguration message to the UE in response to the conditional handover cancellation message. In addition, apparatus 20 may be controlled by memory 24 and processor 22 to send a response message to the target node based on whether or not an acknowledgement message is received from the UE.

Certain example embodiments described herein provide several technical improvements, enhancements, and/or advantages. In some example embodiments, it may be possible to improve signaling for target-initiated CHO modification via cancellation. For instance, it may be possible to provide a messaging sequence in which the source node can differentiate between a genuine (definitive) cancellation and modification-driven cancellation. It may also be possible for the source node to decide on whether or not to send a new CHO request to the target node for providing an updated CHO command, and avoid race conditions. In addition, it may be possible to prevent handover failure in a CHO cancellation procedure.

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

CBRA Contention Based Random Access
CFRA Contention Free Random Access
CHO Conditional Handover
HO Handover
IE Information Element
eNB Enhanced Node B
gNB 5G or Next Generation NodeB
LTE Long Term Evolution
RRC Radio Resource Control
UE User Equipment A first embodiment is directed to a method that may include receiving a request for conditional handover from a source node. The method may also include sending a conditional handover request acknowledgment message in response to the request. The method may further include sending a conditional handover cancellation message to a source node, wherein the conditional handover cancellation message may include a genuine cancellation or a modification-related cancellation. In addition, the method may include receiving a response message from the source node in response to the conditional handover cancellation message. Further, the method may include deciding to keep or release user equipment context based on the response message.

In a variant, genuine cancellation or a modification-related cancellation may be in the form of a cause value or a separate information element in the conditional handover cancellation message.

In a variant, the response message may include at least a first conditional handover cancellation response confirming that conditional handover command or configuration has been successfully removed from a user equipment, a new conditional handover request, or a second conditional handover cancellation response indicating that the user equipment was not successfully de-configured.

In a variant, the new conditional handover request may include an implicit confirmation that conditional handover command or configuration has been successfully removed from the user equipment.

In a variant, the method may further include releasing the user equipment context if the response message comprises the first conditional handover cancellation response or the new conditional handover request.

In a variant, the method may further include keeping the user equipment context if the response message comprises the second conditional handover cancellation response indicating that the user equipment was not successfully de-configured.

A second embodiment may be directed to a method that may include receiving a measurement report from a user equipment. The method may also include sending a request for conditional handover to a target node in response to the measurement report. The method may further include receiving a conditional handover cancellation message from the target node, wherein the conditional handover cancellation message may include a genuine cancellation or a modification-related cancellation. Further, the method may include sending a reconfiguration message to the user equipment in response to the conditional handover cancellation message. In addition, the method may include sending a response message to the target node based on whether or not an acknowledgement message is received from the UE.

In a variant, genuine cancellation or a modification-related cancelation may be in the form of a cause value or a separate information element in the conditional handover cancellation message.

In a variant, the response message may include at least a first conditional handover cancellation response confirming that conditional handover command or configuration has been successfully removed from a user equipment, a new conditional handover request, or a second conditional handover cancellation response indicating that the user equipment was not successfully de-configured.

In a variant, the new conditional handover request may include an implicit confirmation that conditional handover command or configuration has been successfully removed from the user equipment.

In a variant, if the acknowledgement message is received, the response message includes the first conditional handover cancellation response or the new conditional handover request.

In a variant, if the acknowledgement message is not received, the response message includes the second conditional handover cancellation response.

Another embodiment is directed to an apparatus including at least one processor and at least one memory including computer program code. The at least one memory and the computer program code may be configured, with the at least one processor, to cause the apparatus at least to perform the method according to the first embodiment or the second embodiment or any of their variants discussed above.

Another embodiment is directed to an apparatus that may include circuitry configured to perform the method according to the first embodiment or the second embodiment or any of their variants.

Another embodiment is directed to an apparatus that may include means for performing the method according to the first embodiment or the second embodiment or any of their variants.

Another embodiment is directed to a computer readable medium including program instructions stored thereon for performing at least the method according to the first embodiment or the second embodiment or any of their variants.

The invention claimed is:

1. A method, comprising:
receiving, by a source node, a conditional handover cancellation message from a target node, wherein the conditional handover cancellation message comprises an indication indicating modification-related cancellation for a user equipment, and wherein the indication comprises a cause value or an information element; and
sending a response message from the source node to the target node, wherein the response message comprises an indicator indicating whether the user equipment has successfully reconfigured and/or released conditional handover to enable the target node to determine, when the indicator indicating the user equipment has not successfully reconfigured and/or released conditional handover, to retain user equipment context for a period of time during which the user equipment may or may not complete conditional handover to the target node or another target node, wherein the period of time is a configured parameter.

2. The method of claim 1, further comprising:
determining, by the source node, whether or not to send a conditional handover request to the target node for providing an updated conditional handover command.

3. The method of claim 1, wherein the indication comprises at least one reason for the modification-related cancellation.

4. The method of claim 3, wherein the at least one reason comprises at least one of: one or more bearers cannot be supported, one or more packet data unit sessions cannot be supported, one or more new bearers previously rejected can be now supported, one or more packet data unit sessions previously rejected can be now support, and contention-free random access information change.

5. The method of claim 1, further comprising:
sending a reconfiguration message to the user equipment, and wherein the reconfiguration message comprises an indicator indicating release of conditional handover command and/or configuration.

6. The method of claim 5, further comprising:
determining, by the source node and in response to sending the reconfiguration message, whether an acknowledgement is received from the user equipment.

7. The method of claim 1, wherein the response message comprises a conditional handover cancel response message.

8. The method of claim 1, wherein the response message comprises a conditional handover request message.

9. An apparatus, comprising:
one or more processors; and
one or more memories including computer program code,
the one or more memories and the computer program code configured, with the one or more processors, to cause the apparatus to at least:
receive a conditional handover cancellation message from a target node, wherein the conditional handover cancellation message comprises an indication indicating modification-related cancellation for a user equipment, and wherein the indication comprises a cause value or an information element; and
send a response message to the target node, wherein the response message comprises an indicator indicating whether the user equipment has successfully reconfigured and/or released conditional handover to enable the target node to determine, when the indicator indicating the user equipment has not successfully reconfigured and/or released conditional handover, to retain user equipment context for a period of time during which the user equipment may or may not complete conditional handover to the target node or another target node, wherein the period of time is a configured parameter.

10. The apparatus of claim 9, wherein the apparatus is further caused to:
determine whether or not to send a conditional handover request to the target node for providing an updated conditional handover command.

11. The apparatus of claim 9, wherein the indication comprises at least one reason for the modification-related cancellation.

12. The apparatus of claim 11, wherein the at least one reason comprises at least one of: one or more bearers cannot be supported, one or more packet data unit sessions cannot be supported, one or more new bearers previously rejected can be now supported, one or more packet data unit sessions previously rejected can be now support, and contention-free random access information change.

13. The apparatus of claim 9, wherein the apparatus is further caused to:
send a reconfiguration message to the user equipment, and wherein the reconfiguration message comprises an indicator indicating release of conditional handover command and/or configuration.

14. The apparatus of claim 13, wherein the apparatus is further caused to:
determine, in response to sending the reconfiguration message, whether an acknowledgement is received from the user equipment.

15. The apparatus of claim 9, wherein the response message comprises a conditional handover cancel response message.

16. The apparatus of claim 9, wherein the response message comprises a conditional handover request message.

17. An apparatus, comprising:
one or more processors; and
one or more memories including computer program code,
the one or more memories and the computer program code configured, with the one or more processors, to cause the apparatus to at least:
send, to a source node, a conditional handover cancellation message, wherein the conditional handover cancellation message comprises an indication indicating modification-related cancellation, and wherein the indication comprises a cause value or an information element; and
receive a response message from the source node, wherein the response message comprises an indicator indicating whether a user equipment has successfully reconfigured and/or released conditional handover; and
determine, when the indicator indicating the user equipment has not successfully reconfigured and/or released conditional handover, to retain user equipment context for a period of time during which the user equipment may or may not complete conditional handover to the apparatus or another target node, wherein the period of time is a configured parameter.

18. The apparatus of claim 17, wherein the apparatus is further caused to:
receive a conditional handover request from the source node for providing an updated conditional handover command.

19. The apparatus of claim 17, wherein the indication comprises at least one reason for the modification-related cancellation.

20. The apparatus of claim 17, wherein the response message comprises at least one of: a conditional handover cancel response message or a conditional handover request message.

\* \* \* \* \*